Nov. 16, 1965   S. J. JENNINGS   3,217,475
COTTON PICKING APPARATUS
Filed Sept. 3, 1963
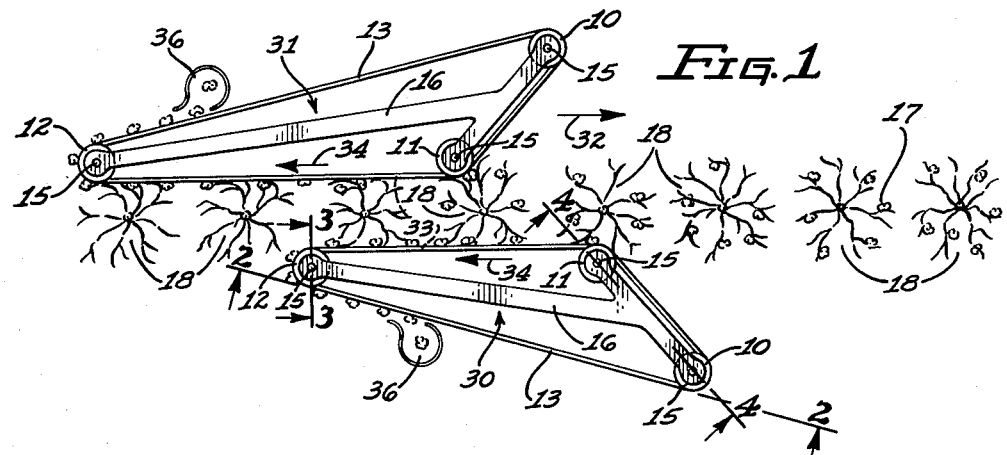
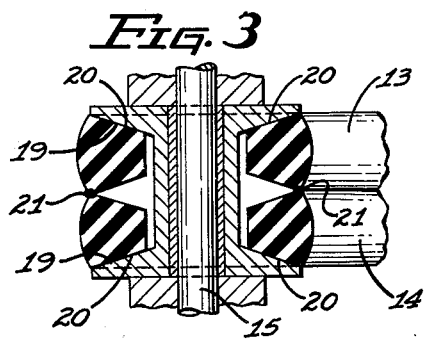
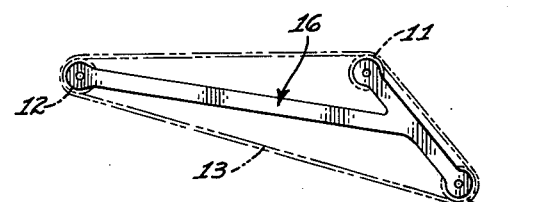
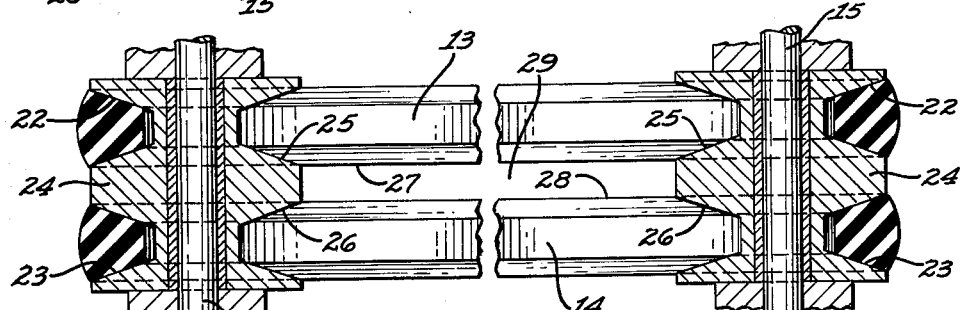
INVENTOR.
SAMUEL J. JENNINGS.
BY
Willard S. Grove
ATTORNEY.

United States Patent Office 3,217,475
Patented Nov. 16, 1965

3,217,475
COTTON PICKING APPARATUS
Samuel Joseph Jennings, 3702 E. Pasadena Ave.,
Phoenix, Ariz.
Filed Sept. 3, 1963, Ser. No. 306,013
4 Claims. (Cl. 56—49)

This invention pertains to agricultural machinery and more particularly to cotton picking apparatus.

One of the objects of this invention is to provide a cotton picking apparatus that is simple in construction and trouble-free in operation.

Another object of this invention is to provide a cotton picking apparatus in which the cotton plant stalks and bolls cannot be injured.

A further object of this invention is to provide a cotton picking apparatus in which there are no beating and no twisting and entangling of the cotton during the picking operations.

It is another object of this invention to provide a pair of laterally spaced and angularly disposed moving belts providing diverging and converging sections adapted to pick, secure and release cotton from the cotton plants in the field.

And it is a still further object to provide the aforementioned pickup belt system in which the belts move with or without power as actuated by the plants as the machine moves along the cotton field row.

Further features and advantages of this invention will appear from a detailed description of the drawings in which:

FIG. 1 is a diagrammatic plan view of a cotton picking apparatus incorporating the features of this invention.

FIG. 2 is a side elevation of the apparatus indicated by the line 2—2 in FIG. 1.

FIG. 3 is an enlarged sectional view on the line 3—3 of FIG. 1.

FIG. 4 is an enlarged sectional view on the line 4—4 of FIG. 1.

FIG. 5 is an enlarged plan view of a support frame for the apparatus.

As an example of one embodiment of this invention, there is shown a cotton picking apparatus comprising a plurality of sheaves 10, 11 and 12 over which operates a pair of V-belts 13 and 14. Each of the sheaves is journaled against axial movement on suitable support rods 15 carried in a suitable support frame 16 located at each end of the rods 15. The frames 16, having suitable belt tightening means, not shown, may be supported and carried in any suitable manner on a tractor or other vehicle for transporting along a row 17 of cotton plants 18.

The sheave 12 takes the form of a spool, FIG. 3, having sloping faces 19 engaging the outer faces 20 of the V-belts 13 and 14 and axially spaced so that the inner adjacent V-belt edges run in contact at the point 21 as the belts pass over the sheave 12. The sheaves 10 and 11 are constructed, as shown in FIG. 4, with angular faces 22 and 23 and with intermediate spacer portions 24 having angular faces 25 and 26 for maintaining the belt edges 27 and 28 of the respective belts 13 and 14 laterally separated to provide a pickup space 29 therebetween extending between the sheaves 10 and 11.

Preferably, a plurality of picking units 30 and 31, FIG. 1, are utilized, one on each side of the plant row 17. The units are moved in the direction indicated by the arrow 32 by a suitable tractor. As pointed out above, the belts 13 and 14 are parallel and spaced at 29 as they move from sheave 10 to sheave 11. As the belts move from sheave 11 to sheave 12 they move in angularly related convergent paths to "pinch out" at the contact point 21, FIG. 3, at the sheave 12. As the belts travel from sheave 12 back to the sheave 10 the belts move in angularly related divergent path to "open up" the space 35 as they approach the sheave 10.

As the picking units 30 and 31 are moved along the plant row in the direction of the arrow 32, the cotton plants 18 first engage the belts 13 and 14 between the sheaves 10 and 11 causing the cotton bolls to enter the space 29 between the edges 27 and 28 of the belts, FIG. 4. As the unit proceeds, the bolls pass over the sheave 11 and down the convergent space 33 between the belts from sheave 11 to sheave 12. Since the belts are carried on the freely journaled sheaves 10, 11 and 12, the bolls initially attached to the plants and the plant twigs entered between the belts in the spaces 29 and 33, cause the belts to travel in the direction indicated by the arrows 34.

As the plants initially proceed along the belt run of unit 30 between sheaves 11 and 12 engaging one side of the plants 18, the unit 31 comes into action, initially engaging the plants from the opposite side as best shown in FIG. 1. As the plants relatively pass between the belt runs between sheaves 11 and 12, the cotton bolls become pinched between converging spaces 33. As the bolls move over the sheaves 12 they are pulled from and detached from the plants 17. As the bolls are carried along the diverging belt run from sheave 12 to sheave 10 the bolls are released while at the same time the released bolls are removed from the belts by a suitable suction nozzle doffing device 36 which carries the picked cotton to the usual receptacle.

In this arrangement the cotton stalks are pressed against the belts only, first against the belts of unit 30 on one side, then against the belts of unit 31 on the other side. The cotton plant stalks cannot be injured by the aforementioned belt picking apparatus since there are no beaters, sharp pointed picks or twisting and entangling of the cotton from their natural state in the bolls while all of the belts above described move under the influence of the relative plant travel.

It is understood, if desired, that the sheaves may be connected to their shafts which may be simultaneously driven to cause the belts between sheaves 11 and 12 to travel at the ground speed of the tractor along the crop row. It is to be further understood that the units 30 and 31 may be vertically stacked one on top of the other so as to properly engage the full height of the sides of the plants 18. It is also within the scope of this invention to mount the support rods 15 horizontally and have the belt runs from the sheave 11 to the sheave 12 in contact with the ground surface so as to in the manner described, pick up cotton from the field surface that has fallen from the cotton plants during previous picking operations or bad storms.

It is to be understood that the belts need not necessarily be V-belts but may be rubber, canvas, leather, or wire belts of any suitable material. The belts may be moistened with an appropriate solution to aid them in attracting more cotton.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included.

Having thus fully set forth and described this invention what is claimed and desired to be obtained by United States Letters Patent is:

1. A cotton picking apparatus comprising in combination:
    (a) a pair of radially spaced sheaves,
    (b) a pair of V-belts operating over said sheaves,
    (c) a pair of angularly disposed faces adjacent the outer ends of one of said sheaves adapted to support the inner adjacent edges of said V-belts in running contact,
    (d) a pair of angularly disposed faces adjacent the outer ends of and an intermediate spacer portion on the other sheaf adapted to support the inner adjacent edges of said V-belts in laterally spaced running position so as to provide converging and diverging spaces between the inner adjacent edges of said V-belts.

2. A cotton picking apparatus comprising in combination:
    (a) a pair of radially spaced sheaves,
    (b) a third sheave,
    (c) a pair of V-belts operating over said sheaves,
    (d) belt support surfaces on each of said pair of sheaves to position said belts in parallel spaced running relationship,
    (e) and belt support surfaces on third sheave to position the inner adjacent edges of said belts in direct running contact.

3. A cotton picking apparatus comprising in combination:
    (a) a pair of picking units adapted to be moved along a cotton plant row, with one unit of said pair on one side of the cotton plants in the row and the other unit of said pair on the other side of the cotton plants in said row,
    (b) each unit including a pair of radially spaced sheaves at the forward end thereof having a plurality of V-belts operating in spaced parallel paths of travel over said sheaves and angularly divergently positioned to direction of travel of the unit along the plant row,
    (c) a third sheave at the rear of each unit operatively supporting said V-belts in running contact of said inner edges of said belts positioned to cause a convergent space between said edges from one of said pair of sheaves extending parallel to each side of said plants in said row.

4. A cotton picking apparatus comprising in combination:
    (a) a pair of picking units adapted to be moved along a cotton plant row, with one unit of said pair on one side of the cotton plants in the row and the other unit of said pair on the other side of the cotton plants in said row,
    (b) each unit including a pair of radially spaced sheaves at the forward end thereof having a plurality of V-belts operating in spaced parallel paths of travel over said sheaves and angularly divergently positioned to direction of travel of the unit along the plant row,
    (c) a third sheave at the rear of each unit operatively supporting said V-belts in running contact of said inner edges of said belts positioned to cause a convergent space between said edges from one of said pair of sheaves extending parallel to each side of said plants in said row,
    (d) and a divergent space between said inner edges of the belts from said third sheave and the other of said pair of sheaves,
    (e) and a suction nozzle doffing device adjacent said divergent run of belts between said third sheave and the other of said pair of sheaves.

References Cited by the Examiner
UNITED STATES PATENTS

| | | | |
|---|---|---|---|
| 800,627 | 10/1905 | Childress | 56—38 |
| 923,343 | 6/1909 | Droke | 56—39 |
| 1,020,867 | 3/1912 | Worthington | 56—38 |
| 1,373,983 | 4/1921 | Smith | 56—39 |

ABRAHAM G. STONE, *Primary Examiner.*

RUSSELL R. KINSEY, *Examiner.*